US 10,882,256 B1

(12) United States Patent
Thiel (10) Patent No.: US 10,882,256 B1
(45) Date of Patent: Jan. 5, 2021

(54) DEVICE AND METHOD FOR CALIBRATING AN IRRADIATION SYSTEM OF AN APPARATUS FOR PRODUCING A THREE-DIMENSIONAL WORK PIECE

(71) Applicant: SLM Solutions Group AG, Lübeck (DE)

(72) Inventor: Christiane Thiel, Lübeck (DE)

(73) Assignee: SLM Solutions Group AG, Lübeck (DE)

( * ) Notice: Subject to any disclaimer, the term of this patent is extended or adjusted under 35 U.S.C. 154(b) by 0 days.

(21) Appl. No.: 16/968,656

(22) PCT Filed: Feb. 5, 2019

(86) PCT No.: PCT/EP2019/052734
§ 371 (c)(1),
(2) Date: Aug. 10, 2020

(87) PCT Pub. No.: WO2019/158394
PCT Pub. Date: Aug. 22, 2019

(30) Foreign Application Priority Data

Feb. 15, 2018 (EP) .................................... 18156904

(51) Int. Cl.
*B29C 64/393* (2017.01)
*B29C 64/236* (2017.01)
(Continued)

(52) U.S. Cl.
CPC .......... *B29C 64/393* (2017.08); *B29C 64/236* (2017.08); *B29C 64/241* (2017.08);
(Continued)

(58) Field of Classification Search
CPC .... B29C 64/386; B29C 64/393; G05B 19/401
See application file for complete search history.

(56) References Cited

FOREIGN PATENT DOCUMENTS

| DE | 102013208651 | 11/2014 |
|----|--------------|---------|
| DE | 102013213547 | 1/2015 |

(Continued)

OTHER PUBLICATIONS

International Search Report and Written Opinion of the International Search Authority for PCT/EP2019/052734, European Patent Office, dated Apr. 5, 2019.
(Continued)

*Primary Examiner* — James Sanders
(74) *Attorney, Agent, or Firm* — Williams Mullen; Thomas F. Bergert (57) ABSTRACT

A device (10) for calibrating an irradiation system (12) of an apparatus (14) for producing a three-dimensional work piece is suggested, the irradiation system (12) comprising a first irradiation unit (16) for selectively irradiating a first irradiation beam (18) along a first operating axis (20) onto an irradiation plane (22) and a second irradiation unit (24) for selectively irradiating a second irradiation beam (26) along a second operating axis (28) onto the irradiation plane (22), wherein the device (10) comprises: control unit (30) adapted to control the first irradiation unit (16) so as to irradiate the first irradiation beam (18) onto the irradiation plane (22) according to an irradiation pattern (32) and to control the second irradiation unit (24) so as to displace the second operating axis (28) relative to the irradiation plane (22) such that the second operating axis (28) traverses the irradiation pattern (32) produced by the first irradiation unit (16) onto the irradiation plane (22); and a detecting unit (34) adapted to detect process emissions emitted from a region of an impingement point (36) on the irradiation plane (22) at which the second operating axis (28) of the second irradiation unit (24) passes the irradiation plane (22) and to output signals indicative of the detected process emissions to the control unit (30); and wherein the control unit (30) is further
(Continued)

adapted to determine a position ($x_{1...n}$, $y_{1...n}$) of the irradiation pattern (32) produced by the first irradiation unit (16) on the irradiation plane (22); determine a position ($x'_{S1}$, $y'_{S1}$) of at least one intersection point (38) between the irradiation pattern (22) produced by the first irradiation unit (16) and the second operating axis (28) of the second irradiation unit (24) based on the signals output by the detecting unit (34); and calibrate the irradiation system (12) based on the determined position ($x_{1...n}$, $y_{1...n}$) of the irradiation pattern (32) produced by the first irradiation unit (16) and the determined position ($x'_{S1}$, $y'_{S1}$) of the at least one intersection point.

15 Claims, 3 Drawing Sheets

(51) Int. Cl.
*B29C 64/241* (2017.01)
*B29C 64/282* (2017.01)
*B29C 64/268* (2017.01)
*B33Y 50/02* (2015.01)
*B33Y 30/00* (2015.01)

(52) U.S. Cl.
CPC .......... *B29C 64/268* (2017.08); *B29C 64/282* (2017.08); *B33Y 30/00* (2014.12); *B33Y 50/02* (2014.12)

(56) References Cited

FOREIGN PATENT DOCUMENTS

| DE | 102016200043 | 7/2017 |
|---|---|---|
| EP | 1793979 | 2/2009 |

OTHER PUBLICATIONS

Decision to Grant a European Patent, EP Application No, 18156904.7, dated May 8, 2020, European Patent Office.
Extended European Search Report, EP Application No. 18156904.7, dated Aug. 21, 2018, European Patent Office.

DEVICE AND METHOD FOR CALIBRATING AN IRRADIATION SYSTEM OF AN APPARATUS FOR PRODUCING A THREE-DIMENSIONAL WORK PIECE

CROSS-REFERENCE TO RELATED APPLICATIONS

This application is the U.S. national phase of international application PCT/EP2019/052734, filed on Feb. 5, 2019, which claims the benefit of European application EP 18156904.7 filed on Feb. 15, 2018; all of which are hereby incorporated herein in their entirety by reference.

The invention relates to a device for calibrating an irradiation system of an apparatus for producing a three-dimensional work piece and to a method for calibrating an irradiation system of an apparatus for producing a three-dimensional work piece.

In additive manufacturing methods for manufacturing of three-dimensional work pieces, in particular in powder bed melting methods, a raw material powder is put onto a carrier table in layers and irradiated with a laser beam or a particle beam or the like selectively at a desired position depending on a desired geometry of the work piece. Radiation introduced into the powder layer causes a selective increase in temperature, leading to melting of the raw material powder and/or to a sintering of particles of the powder. The work piece is manufactured layer by layer, wherein for each powder layer irradiation is selectively performed. The raw material powder may be for instance a metal powder, a ceramics powder or a material mixture, possible further comprising additives. Additive manufacturing may be used for the manufacturing of prototypes, tools, spare part, medical prostheses, in particular dental and orthopedic prostheses, as well as for repairing components based on CAD-data.

An example for a device for manufacturing three-dimensional work pieces using powder bed melting is for instance disclosed in EP 1 793 979 B1.

Furthermore, devices with more than one irradiation unit are generally known from the prior art, which allow for a more rapid manufacturing and/or irradiation of a larger area. Typically, in case two irradiation units are used, there is an area in an irradiation plane of the respective manufacturing device in which the processing areas of the two irradiation units overlap, i.e. which is accessible by both irradiation units. In this case, it is imperative to properly calibrate the positioning routines of the two irradiation units in order to assure that the workpiece can be produced at a high precision.

From DE 10 2013 213 547 A1 a calibration device is known, which is put into the processing chamber of a manufacturing device comprising two laser irradiation units, each of which irradiates a laser beam for acting upon a powder bed. The calibration device comprises two detectors for detecting one of the laser beams, which detectors are arranged behind one pinhole each, so that only in case of proper adjustment a laser beam can reach the respective detector.

In view of the prior art, it is an object of the invention to achieve proper calibration of an irradiation system of an apparatus for producing a three-dimensional work piece in an advantageous manner.

This object is achieved by a device for calibrating an irradiation system of an apparatus for producing a three-dimensional work piece and further by a method for calibrating an irradiation system of an apparatus for producing a three-dimensional work piece.

The invention relates to a device for calibrating an irradiation system of an apparatus for producing a three-dimensional work piece. The irradiation system comprises a first irradiation unit for selectively irradiating a first irradiation beam along a first operating axis onto an irradiation plane and a second irradiation unit for selectively irradiating a second irradiation beam along a second operating axis onto the irradiation plane. The device comprises a control unit adapted to control the first irradiation unit so as to irradiate the first irradiation beam onto the irradiation plane according to an irradiation pattern and to control the second irradiation unit so as to displace the second operating axis relative to the irradiation plane such that the second operating axis traverses the irradiation pattern produced by the first irradiation unit onto the irradiation plane. Furthermore, the device comprises a detecting unit adapted to detect process emissions emitted from a region of an impingement point on the irradiation plane at which the second operating axis of the second irradiation unit passes the irradiation plane and to output signals indicative of the detected process emissions to the control unit. The control unit is further adapted to determine a position of the irradiation pattern produced by the first irradiation unit on the irradiation plane and to determine a position of at least one intersection point between the irradiation pattern produced by the first irradiation unit and the second operating axis of the second irradiation unit based on the signals output by the detecting unit. In addition, the control unit is adapted to calibrate the irradiation system based on the determined position of the irradiation pattern produced by the first irradiation unit and the determined position of the at least one intersection point.

The device allows for performing a calibration of an irradiation system in a precise and/or easy manner. It is possible to perform a reliable calibration within a short time. Furthermore, a calibration is possibly performable without the need of opening a processing chamber and/or handling additional equipment. Existing components may be used for calibration, eliminating the need for dedicated calibration devices. Moreover, a calibration can be done not only during commissioning but prior to starting a certain manufacturing job. In addition, a calibration procedure can be fully automized. Furthermore, thermally and/or electrically induced drifts can be effectively compensated for.

The apparatus for producing a three-dimensional work piece may be an apparatus for manufacturing a work piece from a powder bed, e.g. via selective melting, selective sintering or the like. The apparatus for manufacturing a three-dimensional work piece may comprise a process chamber, possibly filled or fillable with an inert gas and/or provided for being at least partly evacuated. The process chamber may comprise at least one window or entrance or the like for in-coupling of at least one irradiation beam, possibly one window or entrance for each beam and/or a window or entrance used for in-coupling of two or more beams. The device for calibrating the irradiation system may be part of the apparatus. In particular, the control unit may be the control unit of the apparatus. It is also conceivable that the device is a retrofittable device and/or a module. The device may be temporarily attachable to and/or detachable from the apparatus.

The first irradiation beam and/or the second irradiation beam may be particle beams, laser beams or other types of beams of electromagnetic radiation. Preferably, the first irradiation beam and the second irradiation beam are of the same type. However, it is in principle conceivable that different types of beams are used. Furthermore, more than two irradiation units are conceivable. Moreover, at least one irradiation unit may be adapted to irradiate more than one irradiation beam.

Preferably, the irradiation system defines an irradiation area in the irradiation plane, which irradiation area is an area accessible by at least one of the irradiation beams. For instance, a central area of the irradiation area may be accessible by both the first irradiation beam and the second irradiation beam, while at least one edge area of the irradiation area may be accessible by only a few or only one irradiation beam. Preferably, the first irradiation unit and/or the second irradiation unit is adapted to move and/or tilt and/or turn its respective operating axis, thus moving the respective irradiation beam and/or its impingement point in the irradiation plane. The irradiation area thus may comprise all accessible impingement points that can be reached by at least one of the irradiation units.

In some embodiments the first irradiation unit and/or the second irradiation unit may be adapted to move its respective operating axis while the respective beam is not activated, i.e. not irradiated. Preferably, the detecting unit comprises at least one detector, which is aligned with the first operating axis or with the second operating axis, in particular such that a detection axis of the detector moves together with the respective operating axis. In a preferred embodiment, each irradiation unit comprises at least one detector aligned with the respective operating axis, wherein in particular all detectors are part of the detecting unit. In particular in this case a detector of the second irradiation unit may be used for detecting the irradiation pattern generation by the first irradiation unit and/or vice versa. In the following, where reference is made to generation of the irradiation pattern by the first irradiation unit and possibly detection of the irradiation unit by the second irradiation unit, it is to be understood that the reversed case is likewise possible and also encompassed by the invention.

The irradiation pattern may be and/or comprise a pattern of any kind, for instance at least one single point, at least one line, which line may be straight, curved, sectionally straight, sectionally curved, angled etc., at least one grid, at least one geometrical form, e.g. a circle, a square, a polygon, etc., and the like. The irradiation pattern may be produced in and/or on a powder bed. The irradiation pattern may as well be produced in and/or on a carrier, e.g. a table, a container or the like, adapted to receive raw material powder. The carrier may be movable, at least upwards and downwards, in particular parallel to a gravitation direction, and possible also sideways. Additionally or alternatively, the irradiation system may be movable towards and/or away from the carrier. Preferably, the irradiation pattern is produced in the same irradiation plane used for producing the three-dimensional work piece, for instance after calibration. The irradiation pattern may be present only while the first irradiation unit irradiates the first irradiation beam. However, it is also possible that the irradiation pattern is still present after switching off the first irradiation beam, for instance since the irradiated material is still exhibiting an increased temperature, excited or otherwise activated according to the irradiation pattern. Moreover, the irradiation pattern may be a temporarily present pattern, for instance a heating pattern, or a permanent pattern, for instance a pattern of a melting and/or a sintering and/or a burning of material.

Process emission emitted from the irradiation pattern may comprise thermal emissions and/or electromagnetic waves, in particular X-ray radiation, UV light, visible light, near-IR light, IR light, far-IR light or microwaves. Preferably, the process emissions stem from the (previous and/or present) irradiation of the irradiation pattern by the first irradiation unit. Alternatively or additionally it is conceivable that the process emission is at least partly generated by the second irradiation unit and/or by the detecting unit, for instance via a probe beam or the like. The process emission may further be a direct emission and/or a secondary emission.

The position of the irradiation pattern comprises at least one point, for instance an origin of the pattern, and preferably all points of the irradiation pattern. Moreover, there may be a plurality of intersection points, for instance in case the irradiation pattern and/or a pattern described by the second operation axis during determination of the position of the intersection point is a grid or the like. At least in some embodiments the irradiation pattern and the pattern described by the second operation axis each are straight lines, which straight lines cross each other at a single intersection point.

In particular, the irradiation pattern is produced by moving the first operating axis along the pattern while the first irradiation beam is activated. Furthermore, the pattern described by the second operating axis may be a pattern along which the second operating axis is moved, preferably while the second irradiation beam is off, in particular in case the detecting unit comprises at least one detector aligned with the second operation axis.

In a preferred embodiment, the irradiation system is calibrated in such a way that after calibration the first operating axis and the second operating axis are moved to the same position in the irradiation plane in case the control unit transmits one certain target position to the first irradiation unit and to the second irradiation unit. Further preferable, a common and identical coordinate system is used for positioning the first operating axis and the second operating axis after calibration.

According to a further embodiment, the control unit is adapted to calibrate the second irradiation unit relative to the first irradiation unit and/or to calibrate the first and second irradiation unit relative to the irradiation plane. This may be done in particular in case a detector of the detecting unit is aligned with the respective operating axis. As a result, a target region and/or position may be easily selected after successful calibration.

A versatile calibration approach can be provided, in particular if the control unit, for calibrating the second irradiation unit relative to the first irradiation unit, is further adapted to compare a first position coordinate system of the first irradiation unit according to which the first irradiation unit is controlled for moving the first irradiation beam over the irradiation plane with a second position coordinate system of the second irradiation unit according to which the second irradiation unit is controlled for moving the second irradiation beam over the irradiation plane. The control unit may be adapted to compare the first coordinate system and the second coordinate systems with respect to a position of their origins and/or a unit length of their axes and/or a relative orientation of their axes.

A high precision of a calibration can be achieved, in particular if the control unit is further adapted to compare a first axis of the first position coordinate system of the first irradiation unit with a first axis of the second position coordinate system of the second irradiation unit; and further to compare a second axis of the first position coordinate system of the first irradiation unit with a second axis of the second position coordinate system of the second irradiation unit. In particular, the first and second axes of the first and second position coordinate system, respectively, are perpendicular to one another. However, other coordinate system like curvilinear coordinate systems, skew coordinate systems, polar coordinate systems or the like are also conceivable. Preferably, the first axes and/or the second axes are compared with respect to their unit lengths, their relative orientation, in particular their parallelity, their curviness and the like.

In another embodiment of the invention, the control unit is further adapted to adjust the first position coordinate system of the first irradiation unit and the second position coordinate system of the second irradiation unit to one another. It is further suggested that control unit, for adjusting the irradiation system, is adapted to change, in particular translationally adjust and/or rotationally adjust and/or rescale, at least one coordinate axis of the first position coordinate system of the first irradiation unit and/or at least one coordinate axis of the second position coordinate system of the second irradiation unit. The control unit may be adapted to adjust the coordinate systems via any suitable coordinate transformation, including e.g. stretching of axes, compression of axes, rotation of axes, shifting of axes and the like. As a result, a common coordinate system can be defined which allows cooperative processing of a work piece after successful calibration.

A high degree of reliability of a calibration can be achieved, in particular if the control unit is further adapted to adjust the irradiation system based on the determined deviation between the determined position and the reference position of the at least one intersection point in such a manner that the deviation between the determined position and the reference position of the at least one intersection point is eliminated. The control unit may be adapted for eliminating the deviation via any appropriate coordinate transformation as described above.

Additionally or alternatively it is conceivable that the control unit is adapted to compare the determined position of the at least one intersection point with at least one reference position so as to determine a deviation between the at least one determined position and the at least one reference position. Furthermore, the control unit may be adapted to calibrate the irradiation system based on the determined deviation between the determined position and the reference position of the at least one intersection point. Analogously to the above, it is possible that a reference coordinate system is associated with the reference position, wherein in this case the first position coordinate system and/or the second position coordinate system can be adjusted to the reference coordinate system. Preferably, the reference position is a pre-defined position in the irradiation plane and in particular in the central area of the irradiation area. The reference position may be a permanently labeled point of the carrier in the irradiation area, for instance a protrusion, an indentation, an inlay of a material different from the rest of the carrier and the like. Both irradiation units may be calibrated with respect to the reference point, in particular in addition to a calibration with respect to each other. As a result, an additional or alternative calibration mode can be provided, which allows for achieving a high precision calibration.

A highly reliable cross-calibration can be performed in an effective manner, in particular if the control unit, when controlling the second irradiation unit so as to displace the second operating axis relative to the irradiation plane, is further adapted to irradiate the second irradiation beam onto the irradiation plane according to a further irradiation pattern such that the further irradiation pattern produced by the second irradiation unit and the irradiation pattern produced by the first irradiation unit intersect one another on the irradiation plane. The detecting unit may be adapted to detect respective process emission from the further irradiation pattern. In particular, both irradiation patterns may be detected by at least one detector aligned with one of the operating axes. It further conceivable that the control unit is adapted to gather position and/or coordinate system information regarding the irradiation pattern via a detector aligned with the second operational axis and in addition it is conceivable that the control unit is adapted to gather position and/or coordinate system information regarding the further irradiation pattern via a detector aligned with the first operational axis. In particular, calibration of the second irradiation unit may be performed using the first calibration unit as reference system and/or calibration of the first irradiation unit may be performed using the second calibration unit as reference system.

In a preferred embodiment the control unit is adapted to control the first irradiation unit and the second irradiation unit in such manner that the at least one intersection point between the irradiation pattern produced by the first irradiation unit and the second operating axis of the second irradiation unit, and in particular the at least one intersection point between the irradiation pattern produced by the first irradiation unit and the further irradiation pattern produced by the second irradiation unit, is disposed within an overlap area of the irradiation plane, the overlap area being assigned to both the first and the second irradiation unit for selectively irradiating the irradiation plane. Preferably, the overlap area is the central area of the irradiation area or at least a part of the irradiation area.

Cross-calibration can be further optimized, in particular if the detecting unit is adapted to detect process emissions emitted from the irradiation plane in direction of the first operating axis of the first irradiation unit and/or second operating axis of the second irradiation unit. As mentioned above, said detection may be performed by at least one detector of the detecting unit which is aligned with at least one of the operating axes.

A pattern generated for the purpose of calibration can be reliably detected, in particular if the detecting unit is adapted to receive and preferably detect thermal radiation and/or electromagnetic radiation emitted from the irradiation plane, in particular parallel to the first operating axis and/or parallel to the second operating axis. The detecting unit may be adapted to detect thermal emissions and/or electromagnetic waves, in particular X-ray radiation, UV light, visible light, near-IR light, IR light, far-IR light or microwaves or the like. For this purpose, the detecting unit may comprise at least one suitable detector, for instance a pyrometric sensor, a photodetector, an electron detector, a detector comprising a scintillator, a photomultiplier or any other type of detector as appropriate. Furthermore, it is conceivable that the control unit is adapted to process signal provided by the detecting unit representing detected process emission with respect to a shape of the signals, in particular depending on a detection mode. For instance, detection and processing of the respective signal may be performed according to a peak detection and/or a drop detection and/or an increased deviation and/or a certain pulse shape or the like, in particular in case the second irradiation beam is used for stimulation process emissions after and/or while the irradiation pattern is produced by the first irradiation beam.

The invention also relates to a method for calibrating the irradiation system of the apparatus for producing a three-dimensional work piece. The method comprises the steps of controlling the first irradiation unit so as to irradiate the first irradiation beam onto the irradiation plane according to an irradiation pattern; and controlling the second irradiation unit so as to displace the second operating axis relative to the irradiation plane such that the second operating axis traverses the irradiation pattern produced by the first irradiation unit onto the irradiation plane. Furthermore, the method comprises the step of detecting process emissions emitted from a region of an impingement point on the irradiation plane at which the second operating axis of the second irradiation unit passes the irradiation plane. In addition, the method comprises the steps of determining a position of the irradiation pattern produced by the first irradiation unit on the irradiation plane; and determining a position of at least one intersection point between the irradiation pattern produced by the first irradiation unit and the second operating axis of the second irradiation unit based on the detected process emissions. Moreover, the method comprises the step of calibrating the irradiation system based on the determined position of the irradiation pattern produced by the first irradiation unit and the determined position of the at least one intersection point.

The method allows for performing a calibration of an irradiation system in a precise and/or easy manner. It is possible to perform a reliable calibration within a short time. Furthermore, a calibration is possibly performable without the need of opening a processing chamber and/or handling additional equipment. Existing components may be used for calibration, eliminating the need for dedicated calibration devices. Moreover, a calibration can be done not only during commissioning but prior to starting a certain manufacturing job. In addition, a calibration procedure can be fully automized.

Preferably, the device is adapted to performing at least one step and in particular all steps of the method. The method may be performed at least partly by the device and/or at least partly with the device.

According to a further embodiment, the second irradiation unit is calibrated relative to the first irradiation unit and/or the first irradiation unit and second irradiation unit are calibrated relative to the irradiation plane. Moreover, the first irradiation unit may be calibrated to the second irradiation unit. It is also conceivable that calibration is iterated at least two times or several times, wherein in particular the irradiation units may be calibrated to each other in turns and/or with respect to the reference point.

It is also suggested that for calibrating the second irradiation unit relative to the first irradiation unit, the method further comprises the step of comparing a first position coordinate system of the first irradiation unit according to which the first irradiation unit is controlled for moving the first irradiation beam over the irradiation plane with a second position coordinate system of the second irradiation unit according to which the second irradiation unit is controlled for moving the second irradiation beam over the irradiation plane. As outlined above, axes of the coordinate systems may be compared. The coordinate systems may further be adjusted to each other as described.

The invention further encompasses an apparatus for producing a three-dimensional work piece, wherein the apparatus comprises the device and the irradiation system. Preferably, the apparatus is adapted to perform the described method.

In the following, the present invention will be exemplarily described with reference to the appending figures. The figures, the description and the claims contain several features in combination. The skilled person will consider these features individually where appropriate and combine them to new combinations within the scope of the claims. In particular features of the described exemplary embodiments may be transferred to other embodiments or omitted where appropriate.

It is shown in.

Figure 1:
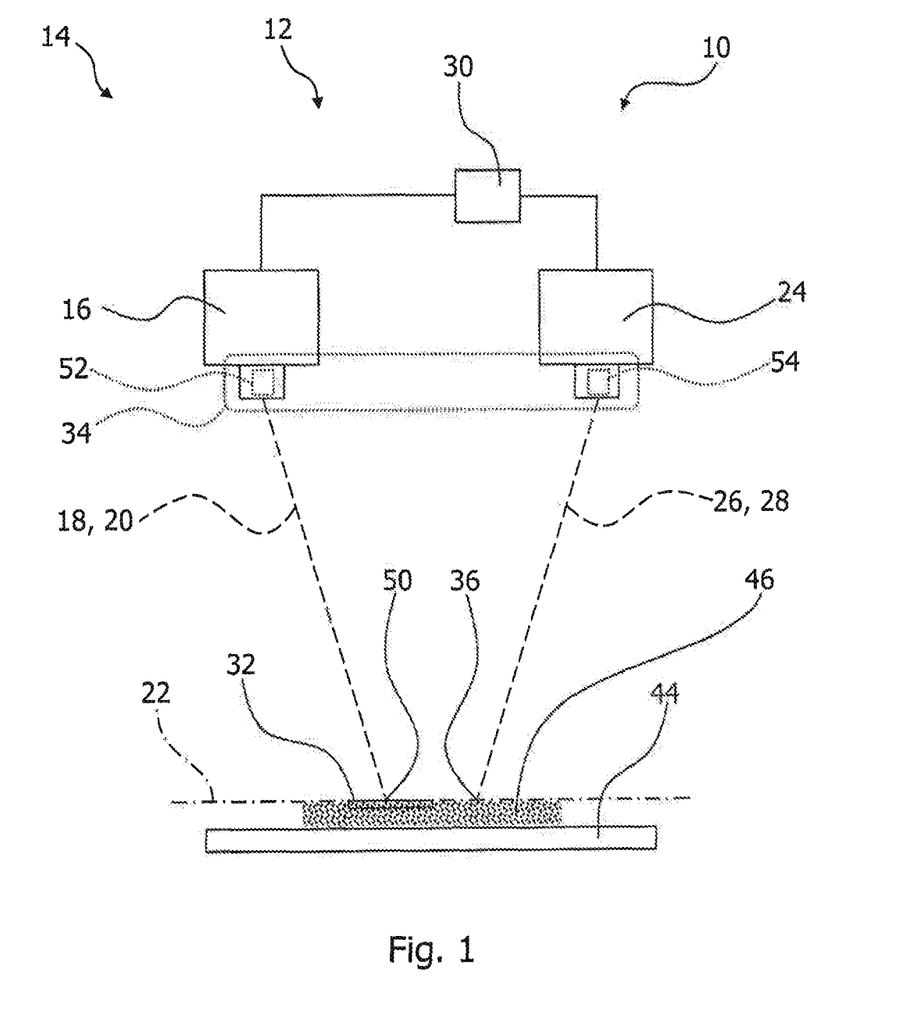
FIG. 1 a schematic side view of a device for calibrating an irradiation system of an apparatus for producing a three-dimensional work piece.

FIG. 1 illustrates a schematic side view of a device 10 for calibrating an irradiation system 12 of an apparatus 14 for producing a three-dimensional work piece. The apparatus 14 is for instance a selective melting apparatus or a selective sintering apparatus. The apparatus 14 comprises a processing chamber, which is not explicitly shown. The processing chamber can be filled with an inert gas. Moreover, the processing chamber comprises at least one incoupling window, which is also not shown.

In the processing chamber, a carrier 44 is movably mounted. The carrier 44 is movable in an upward and downward direction, parallel to a direction of gravitation. In another embodiment, the carrier 44 may be stationary and the irradiation system 12 may be movable towards the carrier 44 and/or away from the carrier 44.

The carrier 44 is adapted to receive layers of raw material powder 46 and move the raw material powder 46 into an irradiation plane 22. The irradiation system 12 in turn is adapted to irradiate raw material powder 46 selectively in the irradiation plane 22, such that the raw material powder 46 is selectively melted and/or sintered and/or otherwise activated for forming a three-dimensional work piece.

The irradiation system 12 comprises a first irradiation unit 16 for selectively irradiating a first irradiation beam 18 along a first operating axis 20 onto the irradiation plane 22. The first irradiation unit 16 is adapted to move the first operating axis 20 across the irradiation plane 22, in the case shown via pivoting the first operating axis 20. Furthermore, the irradiation unit 16 comprises a second irradiation unit 24 for selectively irradiating a second irradiation beam 26 along a second operating axis 20 onto the irradiation plane 22. The second irradiation unit 24 is adapted to move the second operating axis 28 across the irradiation plane 22, in the case shown via pivoting the second operating axis 28.

The first irradiation beam 18 and the second irradiation beam 26 are laser beams. However, as mentioned before, particle beams or other types of beams as well as combinations of beams are likewise conceivable.

The device 10 comprises a control unit 30 adapted to control the first irradiation unit 16 so as to irradiate the first irradiation beam 18 onto the irradiation plane 22 according to an irradiation pattern and to control the second irradiation unit 24 so as to displace the second operating axis 28 relative to the irradiation plane 22 such that the second operating axis 28 traverses the irradiation pattern 32 produced by the first irradiation unit 16 onto the irradiation plane 22.

In the case shown, the control unit 30 is a control unit of the apparatus 14. The control unit 30 may thus be adapted to control operation of the apparatus 14 for producing the three-dimensional work piece.

Figure 2:
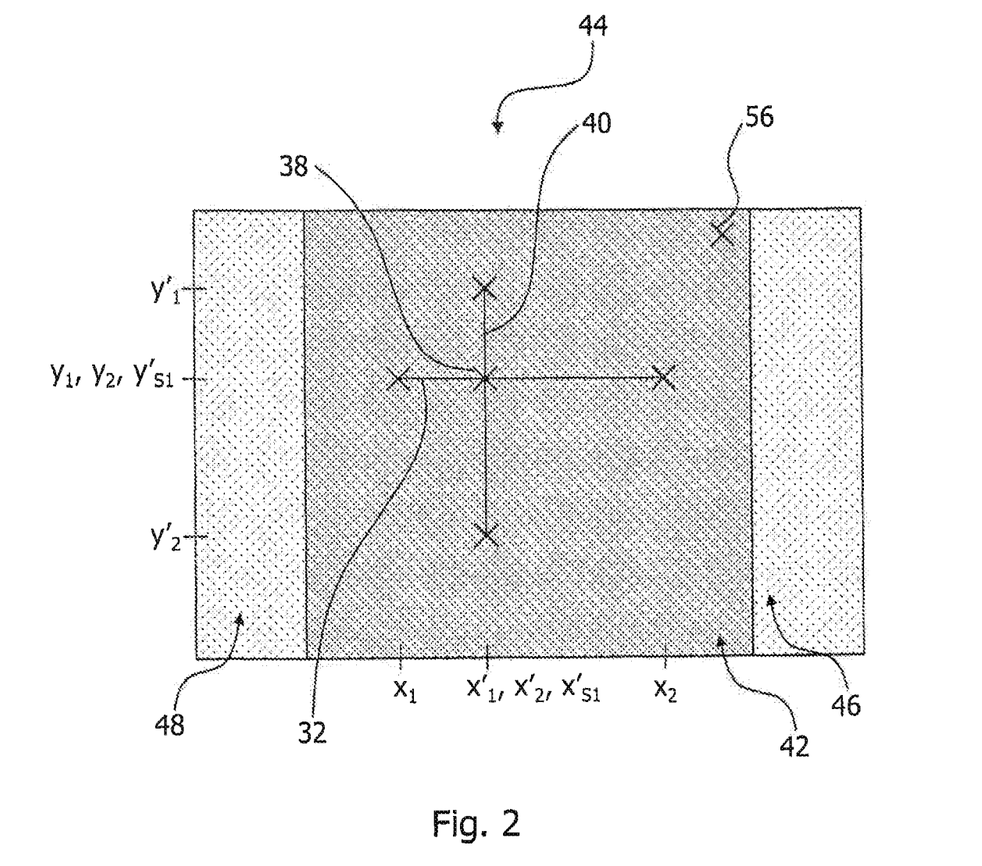
FIG. 2 a schematic top view of an irradiation area of the apparatus.

FIG. 2 illustrates a schematic top view of an irradiation area 44 of the apparatus 14 within the irradiation plane 22. The irradiation area 44 encompasses an overlap area 42, which is a central area of the irradiation area 44. Moreover, the irradiation area 44 encompasses a first edge area 46 and a second edge area 48. The first edge area 46 is accessible only by the first irradiation unit 16. The second edge area 48 is accessible only by the second irradiation unit 24. The overlap area 42 is accessible by both irradiation units 16, 24. The irradiation area 44 is a total area accessible by the irradiation units 16, 24. When manufacturing a work piece or a portion of a workpiece within the overlap area 42, both irradiation units 16, 24 may be used simultaneously and/or in alternative.

In the following, reference is made again also to FIG. 1. The device 10 further comprises a detecting unit 24 adapted to detect process emissions emitted from a region of an impingement point 36 on the irradiation plane 22 at which the second operating axis 28 of the second irradiation unit 24 passes the irradiation plane 22 and to output signals indicative of the detected process emissions to the control unit 30. In the case shown, the detecting unit 24 is likewise adapted to detect process emissions emitted from a region of an impingement point 50 on the irradiation plane 22 at which the second operating axis 28 of the second irradiation unit 24 passes the irradiation plane 22 and to output signals indicative of the detected process emissions to the control unit 30.

The detecting unit 34 comprises a first detector 52. The first detector 52 is aligned with the first operating axis 18. The first detector 52 is part of the first irradiation unit 16.

The detecting unit 34 comprises a second detector 54. The second detector 54 is aligned with the second operating axis 28. The second detector 54 is part of the second irradiation unit 16.

The detecting unit 34 is adapted to detected thermal radiation. In the case shown, the first detector 52 and the second detector 54 are pyrometric detectors. The irradiation patterns 32, 40 are heating patterns, which are detectable for a certain time after their generation since the material is still at a higher temperature in points associated with the respective irradiation pattern 32, 40. Therefore, one of the irradiation patterns 32, 40 or both irradiation patterns 32, 40 may be produced prior to detection with the detector 52, 54 of the respective other irradiation unit 16, 24.

According to other embodiments, an irradiation pattern may be a pattern of permanently changed material properties, for instance a pattern melted and/or sintered into the raw material powder 46. Furthermore, in other embodiment other types of detectors are conceivable, for instance for detecting electromagnetic radiation. Moreover, one of the irradiation beams 18, 26 may be additionally used during detecting. For instance, after producing the irradiation pattern 32, the second irradiation beam 26 may be scanned across the irradiation pattern 32 and deflections and/or other types of alterations of the second irradiation beam 26 due to its interaction with the irradiation pattern 32 may be detected by the detecting unit 34, in particular by the second detector 54. The same is possible vice versa for the further irradiation pattern 40.

With reference to FIG. 2, the first irradiation pattern 32 is exemplarily illustrated as a straight line extending from $(x_1, y_1)$ to $(x_2, y_2)$. The first irradiation pattern 32 is produced by moving the first irradiation beam 18 between these points. In the case shown the raw material powder 46 is heated according to the first irradiation pattern 32.

Moreover, in the case shown, a further irradiation pattern 40 is produced using the second irradiation unit 24. The further irradiation pattern 40 is exemplarily illustrates as a straight line extending from $(x'_1, y'_1)$ to $(x'2, y'_2)$.

As outline above, the irradiation pattern 32 and/or the further irradiation pattern 40 may be or comprise any kind of pattern, for instance grids, geometrical forms, several lines etc. Accordingly, several intersection points may be present.

However, for the following, it is to be understood that only a single irradiation pattern 32, 40 may be used, whereas the respectively other operating axis 20, 28 is used according to the respectively other irradiation pattern 32, 40 but with the respective irradiation beam 18, 26 being switched off. For instance, as described above, the irradiation pattern 32 may be produced using the first irradiation unit 16, but the second operating axis 28 may be moved from $(x'_1, y'_1)$ to $(x'_2, y'_2)$ while the second irradiation beam 26 is switched off, thus only detecting with the second detector 54.

Moreover, in the case shown the irradiation pattern 32 is detected using the second detector 54 and the further irradiation pattern 40 is detected using the first detector 52. Detection may be performed simultaneously to irradiating the first and/or the second irradiation beam 18, 26 or before or after irradiating the first and/or the second irradiation beam 18, 26, in particular before or after generating the irradiation pattern 32 and/or the further irradiation pattern 40.

The control unit 30 is further adapted to determine the position $(x_{1\ldots n}, y_{1\ldots n})$ of the irradiation pattern 32 produced by the first irradiation unit 16 on the irradiation plane 22. Moreover, the control unit 30 is adapted to determine a position $(x'_{S1}, y'_{S1})$ of at least one intersection point 38 between the irradiation pattern 32 produced by the first irradiation unit 16 and the second operating axis 28 of the second irradiation unit 24 based on the signals output by the detecting unit 34. In the case exemplarily shown, there is a single intersection point 38. However, in case another irradiation pattern 32 or other irradiation patterns 32, 40 are used, several intersection points 38 or even intersection lines or the like may be present. Moreover, in the case shown the intersection point 38 is an intersection point of the irradiation patterns 32, 40. However, it may as well be an intersection point 38 of one of the irradiation patterns 32, 40 and a respective scanning/detecting pattern of the respective other irradiation unit 16, 24.

Furthermore, the control unit 30 is adapted to calibrate the irradiation system 12 based on the determined position $(x_{1\ldots n}, y_{1\ldots n})$ of the irradiation pattern 32 produced by the first irradiation unit 16 and the determined position $(x'_{S1}, y'_{S1})$ of the at least one intersection point.

The prime symbol (') used for labeling of certain coordinates indicate that these coordinates are expressed as viewed by the second irradiation unit 24. According to the shown embodiment, coordinates without prime are determined by the first irradiation unit 16. After calibration, prime and non-prime coordinates preferably match.

The control unit 30 is adapted to calibrate the second irradiation unit 24 relative to the first irradiation unit 16. In the case shown, the control unit 30 is further adapted to calibrate the first irradiation unit 16 relative to the second irradiation unit 24. Cross calibration may thus be achieved. However, it is to be understood that the illustrated device as well as the illustrated method may be based on a detecting unit 34 with a single detector 52, 54 and/or may be based on calibrating only one of the irradiation units 16, 24 relative to the other.

The control unit 30, for calibrating the second irradiation unit 24 relative to the first irradiation unit 16, is further adapted to compare a first position coordinate system of the first irradiation unit 16 according to which the first irradiation unit 16 is controlled for moving the first irradiation beam 18 over the irradiation plane 22 with a second position coordinate system of the second irradiation unit 24 according to which the second irradiation unit 24 is controlled for moving the second irradiation beam 26 over the irradiation plane 22. These coordinate systems relate to the mentioned prime and non-prime coordinates.

The control unit 30 is further adapted to compare a first axis of the first position coordinate system of the first irradiation unit 16 with a first axis of the second position coordinate system of the second irradiation unit 24. These axes are for instance x-axes. Moreover, the control unit 30 is further adapted to compare a second axis of the first position coordinate system of the first irradiation unit 16 with a second axis of the second position coordinate system of the second irradiation unit 24. These axes are for instance y-axes. In the case shown, the first and second axes of the first and second position coordinate system, respectively, are perpendicular to one another. However, in case other coordinate systems are used, for instance skew coordinates, polar coordinates etc., non-parallel axes are likewise conceivable.

The control unit 30 is further adapted to adjust the first position coordinate system of the first irradiation unit 16 and the second position coordinate system of the second irradiation unit 24 to one another. Eventually, both irradiation units 16, 24 are operated according to the same coordinate system, as a result of a successful calibration.

The control unit 30, for adjusting the irradiation system 12, is adapted to change, in particular translationally adjust and/or rotationally adjust and/or rescale, at least one coordinate axis of the first position coordinate system of the first irradiation unit 16 and/or at least one coordinate axis of the second position coordinate system of the second irradiation unit 24. Any type of suitable coordinate transformation is conceivable. The control unit 30 is adapted to selected and perform one or more suitable coordinate transformations for adjusting the coordinate systems.

The control unit 30 is adapted to control the first irradiation unit 16 and the second irradiation unit 24 in such manner that the at least one intersection point 38 between the irradiation pattern 32 produced by the first irradiation unit 16 and the second operating axis 28 of the second irradiation unit 24, and in particular the at least one intersection point 38 between the irradiation pattern 32 produced by the first irradiation unit 16 and the further irradiation pattern 40 produced by the second irradiation unit 24, is disposed within the overlap area 42 of the irradiation plane 22.

According to one embodiment, the control unit 30 is further or alternatively adapted to calibrate the first and second irradiation unit 16, 24 relative to the irradiation plane 22. As illustrated in FIG. 2, calibration may be performed relative to at least one reference point 56 at a reference position ($x_{R1}$, $y_{R1}$). A plurality of reference positions is conceivable, wherein a reference pattern may be used. The reference pattern is for instance a permanent pattern in the carrier 46. In the shown embodiment, the reference pattern is a single labeled reference point 56 located in the overlap are 42.

According to this embodiment, the control unit 30 is adapted to compare the determined position ($x'_{S1}$, $y'_{S1}$) of the at least one intersection point 38 with the reference position ($x_{R1}$, $y_{R1}$) so as to determine a deviation ($\Delta x_{1\ldots n}$, $\Delta y_{1\ldots n}$) between the at least one determined position ($x'_{S1}$, $y'_{S1}$) and the at least one reference position ($x_{R1}$, $y_{R1}$), and to calibrate the irradiation system 12 based on the determined deviation ($\Delta x_{1\ldots n}$, $\Delta y_{1\ldots n}$) between the determined position ($x'_{S1}$, $y'_{S1}$) and the reference position ($x_{R1}$, $y_{R1}$) of the at least one intersection point 38.

Furthermore, according to this embodiment the control unit 30 is adapted to adjust the irradiation system 12 based on the determined deviation ($\Delta x_{1\ldots n}$, $\Delta y_{1\ldots n}$) between the determined position ($x'_{S1\ldots Sn}$, $y'_{S1\ldots Sn}$) and the reference position ($x_{R1\ldots Rn}$, $y_{R1\ldots Rn}$) of the at least one intersection point 38 in such a manner that the deviation ($\Delta x_{1\ldots n}$, $\Delta y_{1\ldots n}$) between the determined position and the reference position 56 of the at least one intersection point 38 is eliminated.

Calibration using the reference position 56 may be performed in addition to calibrating the irradiation units 16, 24 with respect to each other.

Figure 3:
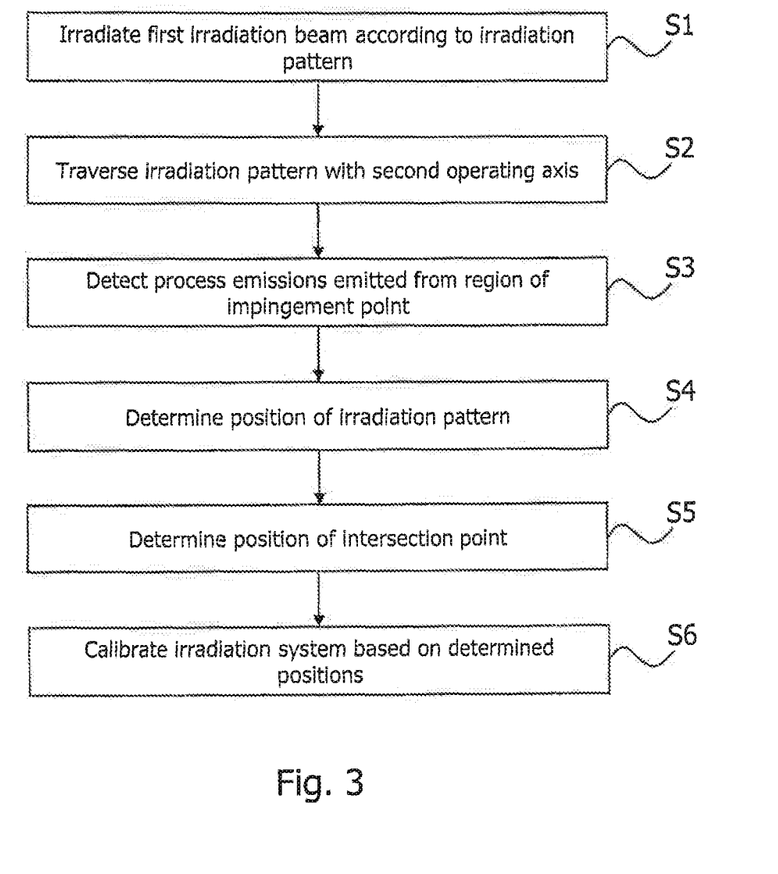
FIG. 3 a schematic flow chart of a method for calibrating an irradiation system of an apparatus for producing a three-dimensional work piece.

FIG. 3 illustrates a schematic flow chart of a method for calibrating the irradiation system 12. The method is performed using the device 10. In the case shown, the device 10 is adapted to perform the method automatically.

The method comprises a step S1 of controlling the first irradiation unit 16 so as to irradiate the first irradiation beam 18 onto the irradiation plane 22 according to an irradiation pattern 32.

The method comprises a step S2 of controlling the second irradiation unit 24 so as to displace the second operating axis 28 relative to the irradiation plane 22 such that the second operating axis 28 traverses the irradiation pattern 22 produced by the first irradiation unit 16 onto the irradiation plane 22.

Moreover, the method comprises a step S3 of detecting process emissions emitted from a region of an impingement point 36 on the irradiation plane 22 at which the second operating axis 28 of the second irradiation unit 24 passes the irradiation plane 22.

Furthermore, the method comprises a step S4 of determining a position ($x_{1\ldots n}$, $y_{1\ldots n}$) of the irradiation pattern 32 produced by the first irradiation unit 16 on the irradiation plane 22.

In addition, the method comprises a step S5 of determining a position ($x'_{S1\ldots Sn}$, $y'_{S1\ldots Sn}$) of at least one intersection point 38 between the irradiation pattern 32 produced by the first irradiation unit 16 and the second operating axis 28 of the second irradiation unit 24 based on the detected process emissions.

The method further comprises a step S6 of calibrating the irradiation system 12 based on the determined position ($x_{1\ldots n}$, $y_{1\ldots n}$) of the irradiation pattern 32 produced by the first irradiation unit 16 and the determined position ($x'_{S1\ldots Sn}$, $y'_{S1\ldots Sn}$) of the at least one intersection point 38.

As outlined in the context of the device 10, calibration may be performed by calibrating the second irradiation unit 24 relative to the first irradiation unit 16 using the second detector 54 for detecting at least a portion of the irradiation pattern 32, in particular the intersection point 38. Likewise, the first irradiation unit 16 may be calibrated relative to the second irradiation unit 24 using the further irradiation pattern 40 and the first detector 52.

According to another embodiment, the apparatus may comprise more than two irradiation units. It is then advisable to perform the calibration as outlined above subsequently for different overlap areas in case there is no common overlap area in which all irradiation units overlap. In case several irradiation units overlap in one common overlap area, calibration of several irradiation units may be performed with respect to one certain irradiation unit.

The invention claimed is:

1. Device for calibrating an irradiation system of an apparatus for producing a three-dimensional work piece, the irradiation system comprising a first irradiation unit for selectively irradiating a first irradiation beam along a first operating axis onto an irradiation plane and a second irradiation unit for selectively irradiating a second irradiation beam along a second operating axis onto the irradiation plane, wherein the device comprises:

a control unit adapted to control the first irradiation unit so as to irradiate the first irradiation beam onto the irradiation plane according to an irradiation pattern and to control the second irradiation unit so as to displace the second operating axis relative to the irradiation plane such that the second operating axis traverses the irradiation pattern produced by the first irradiation unit onto the irradiation plane; and a detecting unit adapted to detect process emissions emitted from a region of an impingement point on the irradiation plane at which the second operating axis of the second irradiation unit passes the irradiation plane and to output signals indicative of the detected process emissions to the control unit, and wherein the control unit is further adapted to:

determine a position $(x_{1\ldots n}, y_{1\ldots n})$ of the irradiation pattern produced by the first irradiation unit on the irradiation plane, determine a position $(x'_{S1}, y'_{S1})$ of at least one intersection point between the irradiation pattern produced by the first irradiation unit and the second operating axis of the second irradiation unit based on the signals output by the detecting unit, and calibrate the irradiation system based on the determined position $(x_{1\ldots n}, y_{1\ldots n})$ of the irradiation pattern produced by the first irradiation unit and the determined position $(x'_{S1}, y'_{S1})$ of the at least one intersection point.

2. The device according to claim 1, wherein the control unit is adapted to calibrate the second irradiation unit relative to the first irradiation unit and/or to calibrate the first and second irradiation unit relative to the irradiation plane.

3. The device according to claim 2, wherein the control unit, for calibrating the second irradiation unit relative to the first irradiation unit, is further adapted to compare a first position coordinate system of the first irradiation unit according to which the first irradiation unit is controlled for moving the first irradiation beam over the irradiation plane with a second position coordinate system of the second irradiation unit according to which the second irradiation unit is controlled for moving the second irradiation beam over the irradiation plane.

4. The device according to claim 3, wherein the control unit is further adapted to:

compare a first axis of the first position coordinate system of the first irradiation unit with a first axis of the second position coordinate system of the second irradiation unit; and compare a second axis of the first position coordinate system of the first irradiation unit with a second axis of the second position coordinate system of the second irradiation unit, wherein in particular the first and second axes of the first and second position coordinate system, respectively, are perpendicular to one another.

5. The device according to claim 3, wherein the control unit is further adapted to adjust the first position coordinate system of the first irradiation unit and the second position coordinate system of the second irradiation unit to one another.

6. The device according to claim 4, wherein the control unit, for adjusting the irradiation system, is adapted to change, in particular translationally adjust and/or rotationally adjust and/or rescale, at least one coordinate axis of the first position coordinate system of the first irradiation unit and/or at least one coordinate axis of the second position coordinate system of the second irradiation unit.

7. The device according to claim 1, wherein the control unit is further adapted to:

compare the determined position $(x'_{S1}, y'_{S1})$ of the at least one intersection point with at least one reference position $(x_{R1}, y_{R1})$ so as to determine a deviation $(\Delta x_{1\ldots n}, \Delta y_{1\ldots n})$ between the at least one determined position $(x'_{S1}, y'_{S1})$ and the at least one reference position $(x_{R1}, y_{R1})$, and calibrate the irradiation system based on the determined deviation $(\Delta x_{1\ldots n}, \Delta y_{1\ldots n})$ between the determined position $(x'_{S1}, y'_{S1})$ and the reference position $(x_{R1}, y_{R1})$ of the at least one intersection point.

8. The device according to claim 7, wherein the control unit is further adapted to adjust the irradiation system based on the determined deviation $(\Delta x_{1\ldots n}, \Delta y_{1\ldots n})$ between the determined position $(x'_{S1\ldots Sn}, y'_{S1\ldots Sn})$ and the reference position $(x_{R1\ldots Rn}, y_{R1\ldots Rn})$ of the at least one intersection point $(S_{1\ldots n})$ in such a manner that the deviation $(\Delta x_{1\ldots n}, \Delta y_{1\ldots n})$ between the determined position and the reference position of the at least one intersection point is eliminated.

9. The device according to claim 1, wherein the control unit, when controlling the second irradiation unit so as to displace the second operating axis relative to the irradiation plane, is further adapted to irradiate the second irradiation beam onto the irradiation plane according to a further irradiation pattern such that the further irradiation pattern produced by the second irradiation unit and the irradiation pattern produced by the first irradiation unit intersect one another on the irradiation plane.

10. The device according to claim 1, wherein the control unit is adapted to control the first irradiation unit and the second irradiation unit in such manner that the at least one intersection point between the irradiation pattern produced by the first irradiation unit and the second operating axis of the second irradiation unit, and in particular the at least one intersection point between the irradiation pattern produced by the first irradiation unit and the further irradiation pattern produced by the second irradiation unit, is disposed within an overlap area of the irradiation plane, the overlap area being assigned to both the first and the second irradiation unit for selectively irradiating the irradiation plane.

11. The device according to claim 1, wherein the detecting unit is adapted to detect process emissions emitted from the irradiation plane in direction of the second operating axis of the second irradiation unit.

12. The device according to claim 1, wherein the detecting unit is adapted to receive thermal radiation and/or electromagnetic radiation emitted from the irradiation plane.

13. A method for calibrating an irradiation system of an apparatus for producing a three-dimensional work piece, the irradiation system comprising a first irradiation unit for selectively irradiating a first irradiation beam along a first operating axis onto an irradiation plane and a second irradiation unit for selectively irradiating a second irradiation beam along a second operating axis onto the irradiation plane, wherein the method comprises the steps of:

controlling the first irradiation unit so as to irradiate the first irradiation beam onto the irradiation plane according to an irradiation pattern;

controlling the second irradiation unit so as to displace the second operating axis relative to the irradiation plane such that the second operating axis traverses the irradiation pattern produced by the first irradiation unit onto the irradiation plane;

detecting process emissions emitted from a region of an impingement point on the irradiation plane at which the second operating axis of the second irradiation unit passes the irradiation plane;

determining a position $(x_{1\ldots n}, y_{1\ldots n})$ of the irradiation pattern produced by the first irradiation unit on the irradiation plane;

determining a position $(x'_{S1}, y_{S1})$ of at least one intersection point between the irradiation pattern produced by the first irradiation unit and the second operating axis of the second irradiation unit based on the detected process emissions; and calibrating the irradiation system based on the determined position $(x_{1\ldots n}, y_{1\ldots n})$ of the irradiation pattern produced by the first irradiation unit and the determined position $(x'_{S1}, y'_{S1})$ of the at least one intersection point.

14. The method according to claim 13, wherein the second irradiation unit is calibrated relative to the first irradiation unit and/or the first and second irradiation unit are calibrated relative to the irradiation plane.

15. The method according to claim 14, wherein, for calibrating the second irradiation unit relative to the first irradiation unit, the method further comprises the step of comparing a first position coordinate system of the first irradiation unit according to which the first irradiation unit is controlled for moving the first irradiation beam over the irradiation plane with a second position coordinate system of the second irradiation unit according to which the second irradiation unit is controlled for moving the second irradiation beam over the irradiation plane.

* * * * *